Patented Aug. 30, 1938

2,128,464

UNITED STATES PATENT OFFICE 2,128,464

PROCESS OF MAKING MIXTURES CONTAINING BITUMINOUS DISPERSIONS

Lester Kirschbraun, Leonia, N. J., assignor, by mesne assignments, to The Patent and Licensing Corporation, New York, N. Y., a corporation of Massachusetts No Drawing. Application August 22, 1931, Serial No. 558,846

1 Claim. (Cl. 106—31)

This application is a continuation in part of my co-pending application Serial No. 448,161, filed April 28, 1930 which latter in turn constitutes a continuation in part of my application Serial No. 313,840 filed October 20, 1928.

This invention relates to aqueous dispersions of substances normally immiscible with water, and has more particular reference to dispersions of bituminous materials in water.

Bituminous dispersions have been known for some time and extensive quantities are being produced commercially at the present time in accordance with certain of the better known and more practical methods available in the art. These dispersions possess certain well defined properties that are, to a considerable extent, governed by the character of the material used as the dispersing agent. The stability of these dispersions is one of the properties which plays an important part in their commercial application. For certain industrial uses, for example, the dispersion is required to be exceedingly stable, while for other uses it may be relatively unstable, and between these extreme limits there are numerous uses to which the dispersions may be applied for which they may be of an intermediate degree of stability. Thus, some of these dispersions have been used in the manufacture of waterproof fibrous products, and where these processes are carried out on the ordinary paper making machines, it is necessary that the dispersion be highly stable in order that it may not be broken by the mechanical influences to which it is subjected during the paper making operation. On the other hand certain of these dispersions have been adapted for use in the building of roads, wherein it is required that the dispersion be relatively unstable so that when applied in a thin layer over the stone or other mineral aggregate the dispersion will very readily be broken on exposure to the air so as to form quickly a partially coalesced film of sufficient continuity to rapidly bind the aggregate, etc.

In numerous other instances in the individual application of these dispersions it becomes necessary to admix with them certain other materials, and where the dispersions are of the comparatively unstable variety difficulty may be encountered in admixing the other substances therewith because of the tendency of the latter to break down the dispersions before the admixing has been completed and the dispersion applied to its intended use. Thus, for example, where it is desired to admix materials such as asbestos with a soap dispersion of bitumen, the latter is almost instantly broken down upon the addition of the asbestos thereto. Similarly, lamp black, Portland cement and certain pigments when added to soap emulsions of asphalt break the emulsion almost immediately. The primary purpose of my present invention is to provide treatment for enabling various materials to be readily admixed with dispersions without causing a breaking down of those dispersions which are, relatively speaking, unstable.

I have found, where breaking down of a dispersion is caused by material added thereto, that this action is in most instances due to the fact that either the charge upon the particles is reversed by the added material, as in the case of lamp black, acid pigments and asbestos, or, as in the case of Portland cement where no substantial change of the charge upon the dispersed particles is incurred, the added material contains polyvalent ions which break the emulsion by reacting with the emulsifying agent as, for instance, soap.

I have found that the foregoing difficulties can be avoided by pretreating the material which it is desired to add to the dispersion in either one or two ways, depending upon which of the foregoing conditions prevails. Thus, if the condition to be dealt with is one where the added substance has a pH value on the opposite side of the isoelectric point of the emulsion so that the added substance will have a tendency to reduce the charge upon the particles and cause the charge thereof to approach or pass through the isoelectric point, then the material to be added to the dispersion is pretreated so as to bring the pH thereof on the same side of the isoelectric point of the emulsion as is the pH of the emulsion itself and preferably to about the pH of the emulsion itself. Methods of incorporating such materials with emulsions of the soap type are illustrated and claimed in my co-pending application Serial No. 448,161.

On the other hand, if the condition to be dealt with is one wherein the material to be added to the emulsion contains or yields in aqueous solution, di- or polyvalent ions which break the emulsion by reacting with the emulsifying agent, then the material may be pretreated with an agent of such character and in such quantity as to remove the water soluble ions from the substance to be combined with the emulsion, by precipitating it into an insoluble compound, preferably less soluble than the insoluble reaction product of the soap and the ion, or in other instances to repress the formation of ions that may react with the soap to form an insoluble compound therewith.

As an example of my invention and representing an embodiment thereof according to conditions as last described, I have been able to produce a mixture of a soap dispersion of asphalt with Portland cement which under ordinary conditions would break down the dispersion before any substantial mixing has taken place. Such a mixture of soap dispersion and cement might be employed with advantage in the production of a mastic floor mix. To this end alkaline material such as trisodium phosphate may be added in suitable quantities to the Portland cement, thereby effecting precipitation of insoluble calcium phosphate through the interaction of the water soluble calcium ions present in the Portland cement, with the trisodium phosphate and thus effecting removal of the water soluble divalent calcium ions from the Portland cement. The soap dispersion employed in this embodiment may comprise 57 to 70% asphalt, 30 to 43% of water; 1 to 7% soap on the aqueous phase; and up to .5% excess alkali on the aqueous phase. The Portland cement pretreated as above described with trisodium phosphate, may then be very readily incorporated in the dispersion without imparing its stability in any perceptible degree. The flooring mix may then be produced with a soap dispersion of asphalt of the character indicated, by mixing suitable quantities of sand or similar aggregate, with the pretreated Portland cement and with the asphalt dispersion. One such mix which has been found suitable, may consist of one part by volume of the pretreated cement; 2 parts by volume of asphalt dispersion and 2 to 4 parts by volume of fine sand.

Similarly, lime bearing rocks or mineral aggregates, such as trap rock containing substantial quantities of fines, may be successfully coated with bituminous dispersions of the character above indicated for the production of premix bituminous concrete, by treating the rock or mineral aggregate with quantities of trisodium phosphate sufficient to precipitate the ionizable calcium or other di- or polyvalent salts carried thereby and maintain the pH of the reaction product and the system at a sufficiently high value.

In lieu of alkaline materials, such as trisodium phosphate, I may employ neutral salts, such as di- or monoammonium phosphate which likewise would precipitate insoluble calcium phosphate by interaction with the calcium salts carried by the Portland cement or mineral aggregates of the above mentioned character. Likewise neutral salts such as sodium oxalate may be employed for this purpose, this salt serving to precipitate insoluble calcium oxalate and thereby removing the ions which otherwise would effect precipitation of an insoluble soap by reaction with the soap emulsifying agent.

In lieu of alkaline or neutral salts, acids or acid salts, such as phosphoric acid, or sodium dihydrogen phosphate, may be employed and again, in this instance, the treating material would serve to precipitate an insoluble polyvalent calcium phosphate. Where acids or acid salts are employed, it is essential that the excess alkali carried in the emulsion be sufficient to prevent the acid or acid salt from lowering the pH of the emulsion to a value approximating the isoelectric point of the emulsion, or the treated product to be admixed and brought back to the alkaline side.

In still another embodiment of the invention, I may employ an alkali such as sodium or potassium hydroxide to pretreat the material to be combined with the emulsion, the hydroxyl ions thus provided, serving to repress the formation of the water soluble di- or polyvalent ions which would otherwise react with the soap used as the emulsifying agent for the dispersion.

Other substances that may be employed in carrying out the invention include ammonia, ammonium oxalate, ammonium tannate and ammonium carbonate.

It is recognized that certain of the substances mentioned herein for carrying out the invention are more or less decomposable in aqueous solution upon contact with air. In such cases, while the reagent functions to prevent breaking of the emulsion when mixed with the material such as mineral aggregate yet decomposition of the reagent after the mixture such as mineral aggregate coated with the emulsion is exposed to the air serves to cause the emulsion to revert to unstable form and thereby decreases the time required for the emulsion to coalesce upon the stone or other aggregate.

I claim as my invention:

A process of waterproofing material with an aqueous emulsion of a hydrocarbon waterproofing agent which comprises pre-treating the material to be waterproofed with a solution of an emulsion stabilizer, and then mixing the material with a quick-breaking aqueous emulsion of a waterproofing agent substantially free of colloidal powders.

LESTER KIRSCHBRAUN.